March 27, 1951     H. STEEN-JOHNSEN     2,546,911

FLYWEIGHT MOUNTING FOR GOVERNORS

Filed Feb. 3, 1949

INVENTOR.

Hall Steen-Johnsen

BY Brown, Critchlow, Flick & Peckham his ATTORNEYS.

Patented Mar. 27, 1951

2,546,911

UNITED STATES PATENT OFFICE 2,546,911

FLYWEIGHT MOUNTING FOR GOVERNORS

Hall Steen-Johnsen, Greensburg, Pa., assignor to Elliott Company, Jeannette, Pa., a corporation of Pennsylvania Application February 3, 1949, Serial No. 74,394

8 Claims. (Cl. 264—15)

This invention relates to governors, and more particularly to the connection of governor flyweights to their rotating supports.

It is among the objects of this invention to provide a governor in which no lubrication is required for the flexibly mounted governor weights, in which friction and wear cannot occur in the flexible mountings of those weights, and in which the flyweights are connected to their supports by inexpensive flexible mountings that require no attention.

In accordance with this invention a pin projects from a supporting member through a flyweight member. An inner rigid ring, preferably metal, is rigidly mounted on the pin, and an intermediate ring of elastically deformable material, such as natural or synthetic rubber or similar material is secured to the outer surface of the inner ring. Secured to the outer surface of the intermediate ring is an outer rigid ring that is rigidly mounted in either the supporting member or the flyweight member, and the pin is rigidly mounted in the other member. With this construction, relative oscillation between the pin and the member which is secured to the outer ring is absorbed by elastic deformation of the intermediate ring, so the relatively moving parts do not rub against each other and therefore do not require lubrication. Preferably, the flyweight is rigidly mounted on the central portion of the pin between a pair of laterally spaced supporting members. In such a case inner rings are rigidly mounted on both ends of the pin and are spaced from outer rings by elastically deformable intermediate rings. The outer rings are rigidly mounted in the supporting members.

Figure 1:
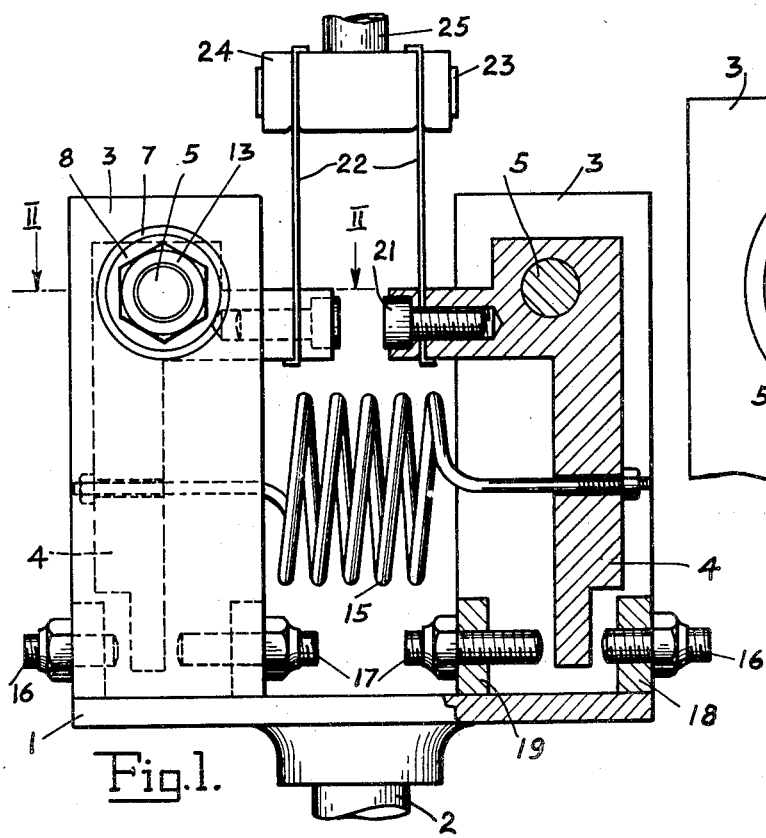
Figure 3:
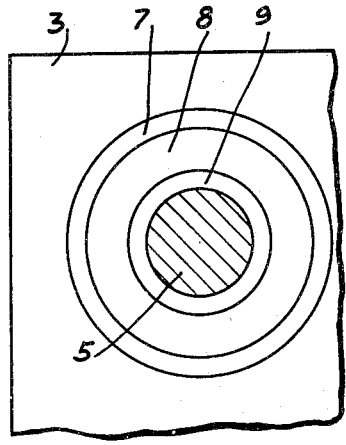
Figure 2:
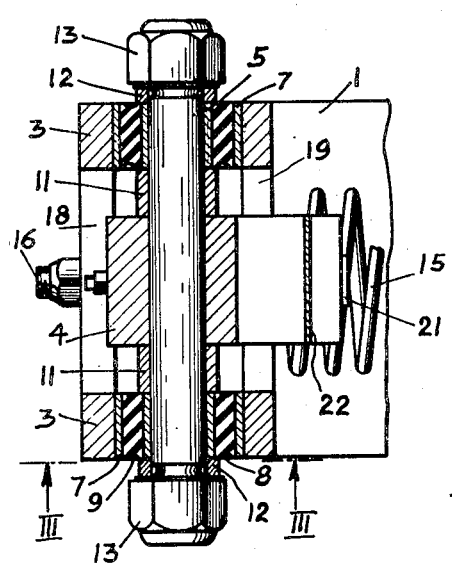
Figure 4:
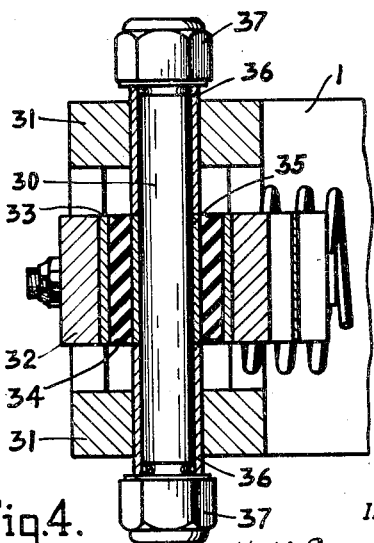

The invention is illustrated in the accompanying drawing, in which Fig. 1 is a fragmentary side view, partly in section, of the driven element of my governor; Fig. 2 is a horizontal section taken on the line II—II of Fig. 1; Fig. 3 is a fragmentary vertical section taken on the line III—III of Fig. 2; and Fig. 4 is a view, similar to Fig. 2, of a modification of this invention.

Referring to the first three figures of the drawing, a flat rectangular head 1 is rigidly mounted on the upper end of a shaft 2 driven by the apparatus to which the speed of the governor is responsive. Mounted on opposite ends of this head are pairs of laterally spaced parallel supporting members, which may be in the form of metal blocks 3. Between each pair of these blocks is a flyweight 4 of any desirable form, the one shown being more or less in the form of an inverted letter L. The upper portion of each weight is provided with a horizontal opening through which a pin 5 extends. The pin also extends through two axially aligned openings in the upper portions of the supporting blocks and has threaded ends that project from those blocks. The diameter of the block openings is materially greater than that of the pin.

It is a feature of this invention that the pin is oscillatably mounted in blocks 3 without there being any bearing surfaces sliding or rolling against each other. Accordingly, an outer metal ring 7 is mounted rigidly in the opening in each supporting block, such as by being driven tightly into it or by being held against rotation in any other suitable manner. Bonded to the inner surface of this ring is a considerably thicker ring 8 of rubber or similar material having the elastic characterisics of rubber. All such material will be referred to herein as rubber-like material. Bonded to the inner surface of this intermediate ring or bushing is an inner metal ring 9 that fits around the adjoining end of the pin. Extending from the inner rings to the weight 4 between them are a pair of sleeves 11 which encircle the pin.

Initially, the pin is slidably mounted in the weight, the sleeves and the inner rings 9. In order to fasten all of these members rigidly to the pin so that the swinging weight will turn the pin and the pin will turn the inner rings, collars 12 are mounted on opposite ends of the pin and are pressed tightly against the outer ends of the adjoining inner rings by means of nuts 13 screwed on the projecting ends of the pin. When the nuts are tightened, the collars force the inner rings and sleeves and flyweight so tightly together that there can be no relative rotation between them and the pin. The result is that when rotation of the head 1 causes the flyweights to swing outward, they turn the pins which thereupon rotate the inner rings 9 in blocks 4. An important feature is that the inner rings do not rub against any supporting elements. Instead, their rotation is absorbed by circumferential stretching or elastic deformation of the rubber-like bushings that connect them to the outer rings 7. Consequently, there is no friction nor wear between relatively rotating parts, and there are no bearing surfaces that require lubrication.

The elasticity of the intermediate rings 8 is not relied upon to absorb the centrifugal force on the weights as the head rotates. That force is absorbed by a coil spring 15 connecting the two weights. The distance that the weights can move in either direction can be controlled by set screws 16 and 17 mounted in bars 18 and 19, respectively, secured to the head between the lower portions of each pair of supporting blocks 4. The upper ends of the weights which project toward each other are clamped by set screws 21 to the lower ends of resilient metal strips 22, the upper ends of which are clamped by set screws 23 to a block 24 on the lower end of a spindle 25 that rotates with head 1. The spindle is moved up and down by the swinging governor weights to control whatever device the governor is intended to control.

In the embodiment of the invention shown in Fig. 4, the horizontal pin 30 is rigidly mounted in the upright supporting blocks 31, and the flyweight 32 is flexibly connected to the central portion of the pin by three concentric rings like those described above. In this arrangement the upper portion of the weight is provided with an enlarged opening through which the pin extends. An outer metal ring 33 is rigidly mounted in that opening and is bonded to an intermediate ring 34 of rubber-like material which in turn is bonded to an inner metal ring 35 encircling the pin. To hold the inner ring and pin stationary relative to blocks 31, rigid sleeves 36 are mounted on the pin on opposite sides of the weight. They extend from the inner ring out through the supporting blocks, beyond which they project a short distance. The sleeves fit so snugly in the blocks that the weight cannot turn them, but they can be moved lengthwise of the pin by screwing nuts 37 tightly against their outer ends. Therefore, the nuts are tightened against the sleeves to force them tightly against the inner ring 35 inside the bushing. As the sleeves will not turn in the supporting blocks under operating conditions, the pin and inner ring likewise are held stationary. Oscillation of the flyweight on the pin is absorbed by elastic deformation of the intermediate ring or bushing 34. Although this embodiment of the invention is feasible, under some conditions the elastic ring might permit the weight to wobble in an undesirable manner. Therefore, the construction shown in the first embodiment of the invention is preferred because there the weight is rigidly mounted on the pin.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A governor comprising a pair of laterally spaced supporting members provided with a pair of aligned openings, an outer metal ring rigidly mounted in each opening, an intermediate ring of rubber-like material bonded to the inner surface of each outer ring, an inner metal ring bonded to the inner surface of each intermediate ring, a pin having its end portions rigidly mounted in said inner rings, and a flyweight rigidly mounted on the pin between said supporting members, whereby oscillation of the pin by the flyweight is absorbed by elastic deformation of said intermediate rings.

2. A governor comprising a pair of laterally spaced supporting members provided with a pair of aligned openings, a pin having its end portions rigidly mounted in said openings, an inner metal ring rigidly mounted on the pin between said supporting members, an intermediate ring of rubber-like material bonded to the outer surface of the inner ring, an outer metal ring bonded to the outer surface of the intermediate ring, and a flyweight rigidly mounted on said outer ring, whereby oscillation of the flyweight is absorbed by elastic deformation of said intermediate ring.

3. A governor comprising a pair of laterally spaced supporting members provided with a pair of aligned openings, an outer metal ring rigidly mounted in each opening, an intermediate ring of rubber-like material bonded to the inner surface of each outer ring, an inner metal ring bonded to the inner surface of each intermediate ring, a pin having its end portions extending through said inner rings and projecting therefrom, the projecting ends of the pins being threaded, perforated means surrounding the pin and extending from one inner ring to the other, said means including a flyweight, and nuts screwed on the threaded ends of the pin for tightening said inner rings against said means, whereby the flyweight and inner rings are rigidly mounted on the pin and oscillation of the pin in said supporting members is absorbed by elastic deformation of said intermediate rings.

4. A governor comprising a pair of laterally spaced supporting members provided with a pair of aligned openings, a pin having threaded end portions extending through said openings and projecting therefrom, an inner metal ring mounted on the pin between said supporting members, an intermediate ring of rubber-like material bonded to the outer surface of the inner ring, an outer metal ring bonded to the outer surface of the intermediate ring, a flyweight rigidly mounted on the outer ring, sleeves on the pin extending from said inner ring through said supporting members, said sleeves being slidable axially in said openings but substantially non-rotatable therein, and nuts screwed on the threaded ends of the pin and engaging the outer ends of the sleeves to press the inner ends of the sleeves tightly against said inner ring, whereby the inner ring and pin are held stationary and oscillation of the flyweight on the pin is absorbed by elastic deformation of said intermediate ring.

5. A governor comprising a pair of laterally spaced supporting members provided with a pair of aligned openings, an outer metal ring rigidly mounted in each opening, an intermediate ring of rubber-like material bonded to the inner surface of each outer ring, an inner metal ring bonded to the inner surface of each intermediate ring, a pin having its end portions extending through said inner rings and projecting therefrom, the projecting ends of the pins being threaded, a flyweight mounted on the pin between and spaced from the supporting members, sleeves on the pin engaging the flyweight and said inner rings, and nuts screwed on the threaded ends of the pin for pressing said inner rings against the sleeves to clamp the flyweight between the sleeves, whereby the flyweight and inner rings are rigidly mounted on the pin.

6. A governor comprising a continuously rotatable head, a supporting member rigidly mounted on the head at one side of its axis of rotation, a flyweight member, a pin projecting from said supporting member and extending through said flyweight member, an inner rigid ring rigidly mounted on the pin, an intermediate ring of elastically deformable material bonded to the outer surface of said inner ring, an outer rigid ring bonded to the outer surface of said intermediate ring and rigidly mounted in one of said members, the pin being rigidly mounted in the other of said members, whereby relative oscillation between the pin and the member secured to said outer ring is absorbed by elastic deformation of said intermediate ring, a resilient metal strip rigidly connected at one end to the flyweight member and extending away from said head in a direction substantially parallel to the axis of rotation of the head, and a floating member coaxial with the head and rigidly connected to the opposite end of said strip for rotation and axial movement by the strip.

7. A governor comprising a continuously rotatable head, two pairs of laterally spaced supporting members rigidly mounted on the head at opposite sides of its axis of rotation, each pair of said members being provided with a pair of aligned openings, a ring of rubber-like material mounted in each opening and rigidly connected with the wall of the opening, a pin having its end portions rigidly mounted in the rings in each pair of supporting members, a flyweight rigidly mounted on each pin between the adjoining supporting members and adapted to swing away from said head axis when the head rotates, a pair of laterally spaced resilient metal strips rigidly connected at one end to the flyweights and extending away from said head on opposite sides of its axis of rotation, and a floating member coaxial with the head and rigidly connected to the opposite end of said strips for rotation and axial movement by them.

8. A governor comprising a continuously rotatable head, two pairs of laterally spaced supporting members rigidly mounted on the head at opposite sides of its axis of rotation, each pair of said members being provided with a pair of aligned openings, an outer rigid ring rigidly mounted in each opening, an intermediate ring of rubber-like material bonded to the inner surface of each outer ring, an inner rigid ring bonded to the inner surface of each intermediate ring, a pin having its end portions rigidly mounted in the inner rings in each pair of supporting members, a flyweight rigidly mounted on each pin between the adjoining supporting members and adapted to swing away from said head axis when the head rotates, the ends of the flyweights adjacent the pins having portions projecting inward toward each other, a pair of laterally spaced resilient metal strips rigidly connected at one end to the inner ends of said projecting portions and extending away from said head on opposite sides of its axis of rotation, and a floating member coaxial with the head and rigidly connected to the opposite end of said strips for rotation and axial movement by them.

HALL STEEN-JOHNSEN.

REFERENCES CITED

The following references are of record in the file of this patent:

UNITED STATES PATENTS

| Number | Name | Date |
| --- | --- | --- |
| 1,940,302 | Humphrey | Dec. 19, 1933 |
| 2,376,665 | Cross | May 22, 1945 |
| 2,458,474 | Jordan | Jan. 4, 1949 |

FOREIGN PATENTS

| Number | Country | Date |
| --- | --- | --- |
| 285,309 | Great Britain | Feb. 16, 1928 |